United States Patent [19]

Koike et al.

[11] Patent Number: 4,856,858
[45] Date of Patent: Aug. 15, 1989

[54] OPTICAL SCANNER

[75] Inventors: Hirofumi Koike, Tokyo; Yukio Endo; Tadashi Mitsuhashi, both of Saitama, all of Japan

[73] Assignee: Citizen Watch Co., Ltd., Tokyo, Japan

[21] Appl. No.: 145,885

[22] Filed: Jan. 20, 1988

[30] Foreign Application Priority Data

Jan. 30, 1987 [JP] Japan .................................. 62-21331
Jan. 30, 1987 [JP] Japan .................................. 62-21332
Feb. 23, 1987 [JP] Japan .................................. 62-41077

[51] Int. Cl.$^4$ ...................... G02B 26/10; H02K 33/00
[52] U.S. Cl. ...................................... 350/6.6; 310/36; 318/128
[58] Field of Search ............... 350/6.6, 6.5, 6.1, 6.91; 310/36; 318/128, 127; 250/235; 358/208

[56] References Cited

U.S. PATENT DOCUMENTS

| | | | |
|---|---|---|---|
| 3,020,414 | 2/1962 | McKnight et al. | 350/6.6 |
| 3,087,373 | 4/1963 | Poor et al. | 350/6.6 |
| 3,166,683 | 1/1985 | Gootherts | 350/6.5 |
| 3,532,408 | 10/1970 | Dostal | 350/6.6 |
| 3,642,344 | 2/1972 | Corker | 350/6.6 |
| 4,135,119 | 1/1979 | Brosens | 350/6.1 |
| 4,186,332 | 1/1980 | Montagu | 318/128 |
| 4,187,452 | 2/1980 | Knappe et al. | 350/6.6 |
| 4,317,611 | 3/1982 | Petersen | 350/6.6 |

FOREIGN PATENT DOCUMENTS

| | | | |
|---|---|---|---|
| 54-39140 | 3/1979 | Japan | 350/6.6 |
| 57-70507 | 5/1982 | Japan | 350/6.5 |

*Primary Examiner*—Jon W. Henry
*Attorney, Agent, or Firm*—Koda & Androlia

[57] ABSTRACT

The present invention provides an optical scanner including a horizontally arranged base plate, a light source unit rigidly mounted on the base plate and adapted to emit a beam of light, an optical scanning unit for scanning the light beam in a repetitive cycle and an optical system unit for conducting the scanning beam to a desired surface to be irradiated, the optical scanning unit including a unit base, a torsion bar rigidly supported on the unit base at the opposite ends, a rotor rigidly mounted on the twistable portion of the torsion bar and having a mirror for reflecting the light beam, an electromagnetic drive mechanism for applying a rotational drive force to the rotor and a unit-side mirror for further reflecting the reflected light from the mirror, the optical scanning unit being arranged such that the torsion bar is disposed parallel to the base plate, the light beam being scanned along a plane perpendicular to the base plate on the rotation of the rotor and the reflected beam being scanned along a plane substantially parallel to the base plate through the unit-side mirror.

6 Claims, 9 Drawing Sheets

OPTICAL SCANNER

BACKGROUND OF INVENTION

1. Field of the Invention:

The present invention relates to an optical scanner and more particularly to improvements of a galvanometer type optical scanner.

2. Description of the Prior Art:

Optical scanners for effecting the deflective scanning of a laser beam or other optical beams have been currently used to object recognizing systems for reading two- or three-dimensional objects, image display systems, laser printers and other systems.

Such optical scanners are realized in various forms such as electrooptical type, acoustooptical type, hologram type or polyhedral rotary mirror type. Galvanometer type optical scanners also are known to perform the scanning at high speeds.

Such galvanometer type optical scanners are disclosed in Japanese Patent Publication No. 50-1402, Japanese Laid-Open Patent Application No. 51-87708 and Japanese Laid-Open Patent Application No. 53-143910 wherein a rotor is fixedly mounted on a torsion bar and includes a reflecting mirror provided therein. The rotor is electromagnetically driven to receive a beam of light on said mirror rotated therewith. In this way, the rotated mirror can provide a desired scanning light during the rotation of the rotor.

The galvanometer type optical scanners can perform the optical scanning at high speeds since the natural frequency of the oscillating system including the torsion bar is high. For example, in the recent laser printers, the galvanometer type optical scanner is very useful for providing a scanning beam of higher resolving power used to write a latent image on the surface of a photosensitive drum.

However, the prior art galvanometer type optical scanners is disadvantageous in that it must have a large-sized optical scanning system since the torsion bar having its length sufficient to reciprocate the rotor with the reflecting mirror therealong must be arranged opposed to a source of light and since the scanning beam must be directed to any desired section to be irradiated, for example, to the surface of a photosensitive drum in a laser printer. This provides a serious problem when the optical scanner is to be incorporated into various types of industrial machines.

Particularly, the prior art utilized an upright type optical scanning unit wherein said torsion bar was vertically arranged. In such an arrangement, it is difficult to reduce the size of the entire machine. It is also impossible to provide a torsion bar which is firmly fixed to the base of the machine. The latter leads to that a steady scanning beam cannot be provided due to vibration of the torsion bar.

In the aforementioned optical scanners, further, there is provided a yoke for producing a driving magnetic flux around the rotor to provide an electromagnetic drive force for the rotor. The static neutral position of the rotor is established at a position wherein the rotor is positioned opposed to the yoke. In such an arrangement, the electromagnetic drive force will be applied to the rotor when the latter is in its maximum speed position wherein the free vibration of the rotor is most stabilized, that is, the static neutral position. The free vibration of the rotor is thus adversely affected by the electromagnetic drive force to prevent the uniformity of velocity or the stability of free vibration from being provided. As a result, the speed of the scanning beam will become unstable.

The second problem in the prior art is that the rotor is attracted by the yoke since the electromagnetic drive force is applied to the rotor at its static neutral position. More particularly, the rotor is suspended from the torsion bar. Only the rotational motion of the rotor is thus required to perform the optical scanning operation. Since the rotor is suspended from the relatively long torsion bar, therefore, the shaft itself of the rotor tends to move easily. As a result, the electromagnetic drive force tends to move the rotor toward the pole end of the yoke rather than the rotation of the rotor. In the worst case, the rotor would be engaged by the yoke to stop the rotational motion of the rotor.

Even though the condition does not reach the above worst condition, the shaft of the rotor will be vibrated to provide an unstable scanning beam when the electromagnetic drive force is applied to the rotor at a position wherein the rotor is moved closer to the yoke.

SUMMARY OF THE INVENTION

In view of the above problems in the prior art, it is an object of the present invention to provide an improved optical scanner which is of a small-sized and compact construction and which can obtain a stable scanning beam having a higher resolving power.

Another object of the present invention is to provide an improved galvanometer type optical scanner which can effectively prevent the attraction of the rotor to the yoke or the vibration of the rotor shaft.

To this end, the present invention provides a galvanometer type optical scanner comprising a base plate and a light source unit, optical scanning unit and optical system unit all of which units are integrally arranged on said base plate, said optical scanning unit including an electromagnetic drive mechanism for rotatably driving an armature through a predetermined angle, said armature consisting of a torsion bar and a rotor, said optical scanning unit being horizontally disposed on said base plate such that said torsion bar is arranged parallel to the plane of said base plate, whereby the entire size of the scanner can be reduced and the torsion bar can be held firmly and stably on the base plate.

The present invention further provides a galvanometer type optical scanner characterized by that the rotor is suspended from a torsion bar fixed to the stationary machine portion at the opposite ends, the static neutral position of the rotor being established at a position which is initially biased through a predetermined angle from a position wherein the rotor is positioned opposed to the yoke and that the electromagnetic drive force applied to the rotor is cut off before the rotor moves to the position wherein the rotor is positioned opposed or close to the yoke.

In accordance with the present invention, therefore, the electromagnetic drive force will be applied to the rotor before the rotor moves close to the yoke. Thus, the rotor can be prevented from being attracted by the yoke. Furthermore, a very stable scanning speed can be provided since the scanning beam is used in a region of free rotor vibration other than the region of electromagnetic drive.

The present invention further provides a galvanometer type optical scanner characterized by that it comprises a torsion bar fixedly mounted at the opposite ends, a rotor suspended from said torsion bar and a yoke for applying an electromagnetic drive force to the rotor, said yoke including pole ends formed into a pair of pole pieces which are positioned on the opposite sides of the path of the rotating rotor along the axial direction in the torsion bar, the pair of pole pieces providing an electromagnetic attraction force for rotatably driving the rotor.

In such an arrangement, the electromagnetic drive force for rotatably driving the rotor is applied to the rotor from the pair of pole pieces which are the pole ends of the yoke. Namely, the electromagnetic attraction force is applied to the rotor equally in the vertical direction along the axis of the torsion bar.

Since the rotor is thus rotatably driven by the electromagnetic attraction force created vertically relative to the rotor, the electromagnetic attraction force applied to the torsion bar in the vertical direction relative to the axis thereof. Therefore, there is avoided the problem of the oscillation of the rotor shaft or the attraction of the rotor to the yoke due to the fact that the rotor is biased in the lateral direction.

DETAILED DESCRIPTION OF THE PREFERRED EMBODIMENTS

Figure 1:
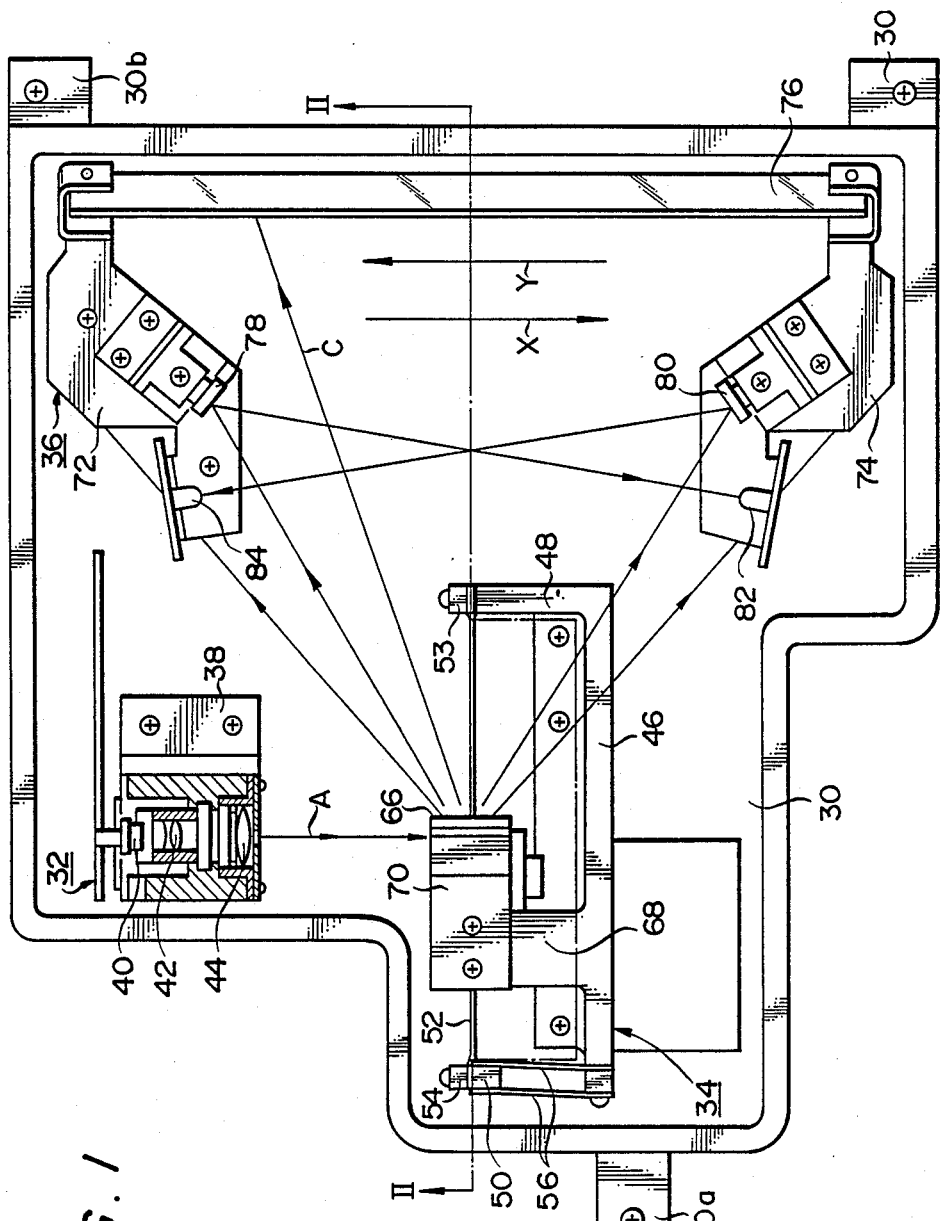
FIG. 1 is a plan view showing a preferred embodiment of an optical scanner constructed according to the present invention.

The present invention will now be described by way of example with reference to some preferred embodiments thereof which are illustrated in the drawings.

Figure 2:
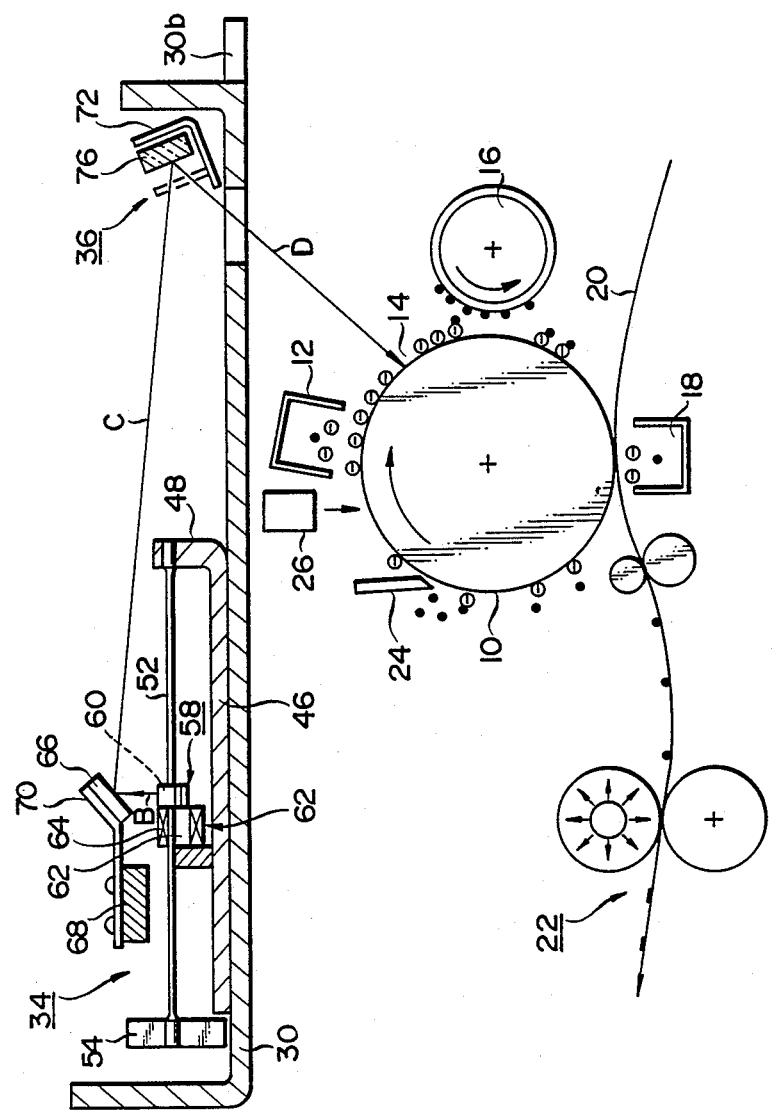
FIG. 2 is a cross-sectional view of FIG. 1, showing the optical scanner which is applied to a system for irradiating the surface of a photosensitive body in a laser printer with a scanning beam.

FIG. 1 shows a plan view of a preferred embodiment of an optical scanner constructed according to the present invention, which is applied to a laser printer while FIG. 2 shows the primary portion of the optical scanner shown in FIG. 1 in cross-section and the schematic construction of an electrostatic recording system in the laser printer.

The electrostatic recording system will first be described with reference to FIG. 2.

A photosensitive drum 10 illustrated in FIG. 2 includes a photosensitive layer formed thereon at the surface of the drum. When the photosensitive drum 10 is rotated by a drive mechanism (not shown), the entire photoconductive surface of the photosensitive layer is first charged uniformly by a charging section 12.

At an exposure station 14, the charged portion of the photoconductive surface corresponding to an image to be recorded is then discharged to form an electrostatic latent image thereon, by the use of an irradiating beam which is conducted from an optical scanner constructed according to the present invention which will be described hereinafter.

Subsequently, toner particles having their polarity opposite to that of said charged portion are applied to said electrostatic latent image from a supply of toner 16 at a development section. The toner particles will be electrostatically attracted to said electrostatic latent image.

At a transfer section 18, the toner particles are transferred onto a sheet of recording paper 20 under the action of opposite charge. As be well-known, the transferred image is fixed to the recording paper 20 under the action of heat or pressure at a fixation station 22.

Toner particles remained on the surface of the photosensitive drum 10 are removed therefrom by means of a cleaning blade at a cleaning section 24. The charge on the photosensitive drum 10 is fully removed by an irradiation of light at an optical discharge section 26. At that time, one cycle of electrostatic recording operations are completed.

The electrostatic recording apparatus is housed within the body of the laser printer. In order to provide the irradiating beam at the exposure section 14, the optical scanner according to the present invention is used. As will be apparent from FIG. 2, the optical scanner is disposed above the electrostatic recording apparatus. In the illustrated embodiment, the optical scanner is formed into a unit separately from the electrostatic recording apparatus and can be optionally incorporated into any one of the conventional electrostatic recording systems.

The optical scanner includes a base plate 30 horizontally disposed within the machine, the base plate being in the form of a flat plate having a reference plane. In the illustrated embodiment, the optical scanner is assembled onto the base plate 30 and firmly held on the electrostatic recording apparatus by means of three legs 30a, 30b and 30c as shown in FIG. 1.

The respective components of the optical scanner on the base plate 30 are unitized, for example, into a light source unit 32, an optical scanning unit 34 and an optical system unit 36 as in the illustrated embodiment.

The light source unit 32 is adjustably held on the base plate 30 by a light source base 38 and includes sources of laser beam such as laser diode 40 and others. A collimator and condensing lenses (42, 44) are arranged on the optical path of the laser beam from the laser diode 40. The condensed light beam A is emitted from the light source unit 32 parallel to the base plate 30.

The optical scan unit 34 is fixedly mounted on the base plate 30 such that the light beam A can repeatedly scan through an accurate cycle. The optical scan unit 34 includes a scan unit base 46 which is adjustably held on the base plate 30.

The scan unit base 46 includes two support arms 48 and 50 formed thereon at the opposite ends. These two support arms 40 and 50 support a torsion bar 52 in such a manner as the latter can freely vibrate at its resonant frequency. In the illustrated embodiment, the torsion bar 52 has enlarged-diameter portions formed thereon at the opposite ends. Each of these enlarged-diameter portions is clamped against the top end of the corresponding support arm 48 or 50 through a clamping element 53 or 54 by the use of any suitable fastening means such as bolt or the like. The support arm 50 is of a construction which can translate relative to the scan unit base 46 under the action of parallel leaf springs 56. When the torsion bar 52 is to be mounted on the optical scan unit 34, the clamping piece 54 is fixedly mounted thereon while pre-tensioning the parallel leaf springs 56. Therefore, the torsion bar 52 will pre-loaded in a direction wherein the opposite ends of the torsion bar are pulled away from each other.

The torsion bar 52 includes a rotor 58 fixedly mounted thereon substantially at its central portion. The rotor 58 includes a reflecting mirror 60 provided thereon at one side. The rotor 58 is made of a material having a high magnetic permeability such as permalloy. The reflecting mirror 60 can be provided by finishing the side of the permalloy rotor into a mirror face.

An armature is defined by the torsion bar 52 and the rotor 58. In order to drive this armature in an electromagnetic manner, the optical scan unit 34 is provided with an electromagnetic drive mechanism 62 which includes a yoke 62 fixedly mounted on the scan unit base 46 and an exciting coil 64 wound around the yoke 62 although they are not clearly illustrated in the drawings. The pole ends of the yoke 62 extend near the region of rotation of the rotor 58. When the exciting coil 64 is energized to create a magnetic flux in the yoke, the rotor 58 is rotatably driven in a predetermined direction under the magnetic reaction between the rotor 58 and the magnetic flux. At that time, the torsional force pre-loaded onto the torsion bar tends to return the torsion bar 52 into its original position. By periodically applying drive pulses to the exciting coil 64, the armature including the torsion bar 52 and the rotor 58 can be rotatably driven in a reciprocation manner at a resonant frequency.

When the light beam A from the light source unit 32 enters the reflecting surface of the mirror 60, the light beam A is reflected therefrom to form a reflected beam B which will scan along a plane substantially perpendicular to the base plate 30 depending on the rotation of the armature.

The optical scanning unit 34 further includes a unit-side mirror 66 which is positioned at a position opposed to the reflected beam B. The unit-side mirror 66 is fixedly mounted on an arm6 68 provided on the scan unit base 46, through a unit-side mirror holder 70.

Therefore, the reflected beam B can be re-reflected by the unit-side mirror 66 to form a scanning beam C which will scan along a plane substantially parallel to the base plate 30.

In the illustrated embodiment, the scanning beam C is reflected by the optical system unit 36 downwardly from the optical scanner as shown in FIG. 2. The downwardly reflected beam is conducted as an irradiating beam D to the surface of the photosensitive drum 10 which is a section to be irradiated in the laser printer. Thus, the aforesaid cycle of electrostatic recording operation will be performed by the use of the irradiating beam D.

The optical system unit 36 comprises a pair of mirror holders 72 and 74 which are adjustably held on the base plate 30. These mirror holders 72 and 74 serves to support an irradiating mirror 76.

The mirror holders 72 and 74 also firmly support an end-position mirror 78 and a home-position mirror 80, respectively. An end-position sensor 82 and a home-position sensor 84 are further fixedly mounted on the mirror holders 74 and 72 at the respective positions co-operating with the mirrors 78 and 80.

By the use of the end-position and home-position sensors 82, 84, time required to scan the light beam between these sensors can be measured. If the so measured time is compared with a standard scan time preset, error in the actual scan time can be determined. Drive pulses to be applied to the exciting coil 64 can be controlled depending on the determined error to adjust the scan time of the light beam into the standard scan time.

Detection signal from the home-position sensor 84 is utilized as a synchronous signal in image data to be carried to the optical scanning beam.

In the present embodiment, the scanning beam C from the unit-side mirror 66 is designed to have its optical path wherein the beam C is reflected by the mirror 66 toward the irradiating mirror 76 and further reflected by the irradiating mirror 76 to the drum portion to be exposed. The optical path of the scanning beam C is set to be equal to an optical path from each of the end-position and home-position mirrors 78 and 80 to the corresponding one of the end-position and home-position sensors 82 and 84. As a result, the construction is such that when the scanning beam C is focused on the drum portion to be exposed as the irradiating beam D, a proper focusing is similarly performed also on the light-receiving face of each of the sensors 82 and 84.

The arrangement aforementioned can operate as follows:

A light beam A from the light source unit 32 is converted by the reflecting mirror 60 of the optical scan unit 34 into a reflected beam B which in turn scan along a plane substantially perpendicular to the base plate 33 by the torsion bar 52 oscillated at its resonant frequency. That scanning beam is further conducted to the irradiating mirror 76 by the unit-side mirror 66 and then transmitted from the irradiating mirror 76 to a predetermined portion to be irradiated.

Thus, the scanning beam C will scan along a plane substantially parallel to the base plate 30 by means of the unit-side mirror 66. Each of the beams will move along the surface of the optical scanner.

Although not clearly be illustrated, the light beam A from the light source unit 32 is controlled on ON and OFF depending on data used to record an image. As a result, by the fact that the irradiating beam conducted to the drum portion to be exposed will be lighted on and off, a latent image corresponding to the image to be recorded can be formed on the surface of the photosensitive body 10.

As will be apparent from the foregoing, the present invention provides a transverse arrangement of the optical scan unit 34 in which its torsion bar 52 is disposed parallel to the base plate 30 horizontally arranged within the machine. Since the scanning beam having its relatively long length is moved substantially parallel to the base plate 30 in addition to the above transverse arrangement, the entire construction of the optical scanner can be reduced in thickness. Therefore, such an optical scanner can very easily be incorporated into various image recording systems such as laser printer and others.

Figure 3:
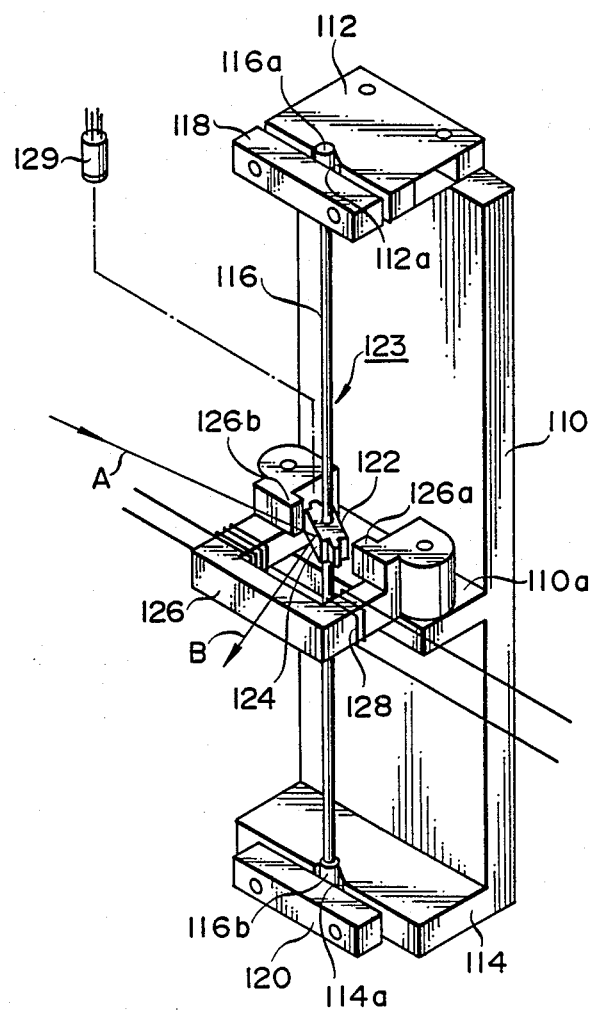
FIG. 3 is a perspective view showing the primary section of another preferred embodiment of an optical scanner constructed according to the present invention.

FIG. 3 shows another embodiment of the optical scanning unit used in the optical scanner according to the present invention.

In FIG. 3, a torsion bar 116 is rigidly mounted at the opposite ends on the respective support arms 112 and 114 which are provided on a scanning unit base 110 at each end. Clamping pieces 118 and 120 are bolted on the support arms 112 and 114, respectively.

The torsion bar 116 has enlarged-diameter portions 116a and 116b at the opposite ends. Each of the enlarged-diameter portions 116a and 116b is firmly clamped in the corresponding one of V-shaped grooves 112a and 114a which are formed on the end faces of the support arms 112 and 114, respectively.

The torsion bar 116 has a twisted or substantially central portion on which a rotor 122 is fixedly mounted. A galvanometer armature 123 is defined by the torsion ban 116 and the rotor 122.

It is thus to be understood that the armature 123 forms a resonant vibration system operated at a predetermined frequency in accordance with the torsional oscillation of the torsion bar 116.

The rotor 122 includes a reflecting mirror 124 formed thereon, which mirror can be formed, for example, by abrading the rotor 122 at one side, in the embodiment shown in FIG. 3.

The rotor 122 is subjected to an electromagnetic drive force from an electromagnetic drive device as will be described. For this purpose, the rotor 122 is made of a material having a high magnetic permeability such as permalloy or the like. The reflecting mirror 124 has a high reflectivity which is obtained by abrading the peramalloy rotor and treating it by any suitable means such as nickel plating or aluminum depositing. The mirror 124 can reflect a light beam A from a source of laser (not shown) to form a reflected beam B which can optionally be changed in direction depending on the rotational angle of the rotor 122.

In order to apply a desired electromagnetic drive force to the armature 123, a yoke 126 is provided with the pole ends 126a and 126b thereof extending into the region in which the rotor 122 is rotated.

In the embodiment of FIG. 3, the yoke 126 is of a substantially C-shaped configuration and bolted on a projection 110a formed substantially at the central portion of the base 110.

The yoke 126 has legs each of which includes an exciting coil 128 wound therearound. In the embodiment of FIG. 3, a desired magnetic flux will be created in the yoke 126 when electric current is flowing in the exciting coils 128. This magnetic flux applies an electromagnetic drive force to the rotor 122.

Although two exciting coils 128 are wound around the legs of the yoke 126 in the illustrated embodiment, a single exciting coil may be provided on the yoke in accordance with the present invention.

Since it is desired to create the magnetic flux in the exciting coils 128 at a predetermined timing, a phase detector is provided to monitor the rotational phase of the rotor 122 at all times.

As shown in FIG. 3, such a phase detector comprises a photosensor 129 consisting of a light emitting part and a light receiving part all of which are assembled into a unit. Depending on the magnitude of an inspecting light from the photosensor 129 which is reflected by the rotor 122, the photosensor 129 generates, at its output terminal, an output substantially in the form of a sinusoidal waveform. By causing electrical waveform shaping and delaying based on such an output waveform from the phase detector, timing of drive signal supplied to the exciting coils 126 is controlled.

In the optical scanning unit shown in FIG. 3, thus, the light beam A is directed to the reflecting mirror 124 on the electromagnetically driven rotor 122 and then reflected by the mirror 124 to form a reflected beam B which in turn performs the scanning in accordance with the rotation of the rotor 122. The velocity of scanning depends on the natural torsional frequency of the torsion bar 116. There can thus be attained a scanning beam having a very stable scanning rate.

The embodiment of FIG. 3 is characterized by that the rotor 122 can have its static neutral position which is initially biased, through a predetermined angle, from the position wherein the rotor 122 is positioned opposed to the yoke 126.

Figures 4, 5, 6:
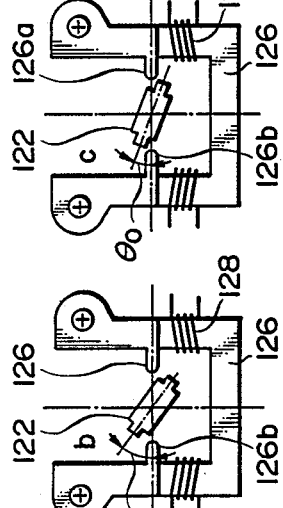

FIG. 6 shows the initial bias position of the rotor 122 which is positioned in the static neutral position c when the vibration of the torsion bar is stopped and the exciting coils 128 are de-energized.

In the static neutral position c, therefore, the rotor 122 is deviated, only by an angle $\theta_0$ which will be called "initial bias angle", from the position wherein the rotor 122 is positioned opposed to the pole ends 126a and 126b of the yoke 126. This initial bias angle $\theta_0$ can be set depending on the characteristics of the optical scanner.

Figure 8:
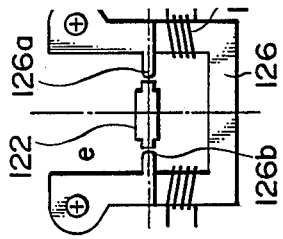
FIGS. 4 to 8 illustrate various different positions of the rotor in the optical scanning unit shown in FIG. 3.

FIGS. 4 through 8 show various different positions of the rotor 122 through a half-cycle of the revolution. The rotor 122 is first rotated from the initial bias position c to the maximum rotational position e in which the rotor 122 is positioned opposed to the pole ends 126a and 126b of the yoke 126 as shown in FIG. 8. Subsequently, the torsion bar is released to return to its original position. Therefore, the rotor 120 will be rotated from the maximum rotational position e through the position d via the neutral position c having the initial bias angle $\theta_0$ to the position b shown in FIG. 5. The rotor 120 is further rotated from the position b to the opposite maximum rotational position a from which position, the rotor re-initiates a rotation in the opposite direction.

As shown in FIGS. 4 to 7, various deviation angles in the rotor 122 are designated $\theta_1$ at the position d, $\theta_2$ at the position b and $\theta_3$ at the position a, respectively.

Figure 9:
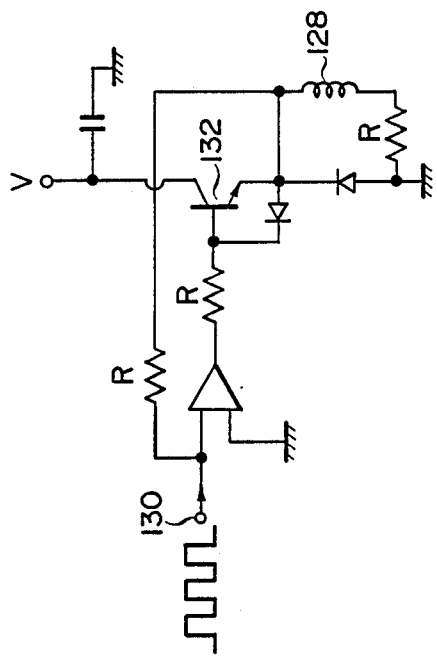
FIG. 9 is a circuit diagram of a drive used in the embodiment of FIG. 3.

FIG. 9 shows a drive circuit for energizing the exciting coils 128, which comprises a drive transistor 132 controlled by the use of drive pulses to the input terminal 130 of the drive circuit. The exciting coil 128 is connected with the emitter side of the drive transistor 132 such that the coil will be energized or de-energized depending on the drive pulses supplied to the drive circuit.

The present embodiment is further characterized by that the timing used to supply the drive circuit shown in FIG. 9 with electric current to drive the rotor 122 as shown in FIGS. 4 to 8 is selected so as to block the drive current before the rotor 122 reaches the position whereat it is positioned opposed to the yoke 126.

Figure 7:
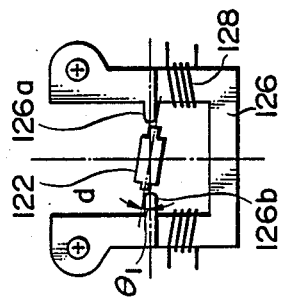

When the rotor 122 begins to be rotated from its static neutral position c shown in FIG. 6 under the action of the magnetic flux created in the yoke 126 by the energization of the exciting coils 128, the rotor 122 will move to the yoke 126 in the sequence shown in FIGS. 6, 7 and 8. In accordance with the present embodiment, the energizing current is cut off before the rotor 122 moves at the position wherein it is positioned opposed to the yoke 126 as shown in FIG. 8. As a result, the rotor 122 will not be attracted to the yoke 126 at the position e shown in FIG. 8. The rotor 122 is electromagnetically driven only when it is rotating from the position of FIG. 4 toward the position of FIG. 8 in the counter-clockwise direction as viewed in FIGS. 4 to 8. When the rotor 122 freely rotates from the position of FIG. 8 in the clockwise direction as viewed in FIGS. 4 to 8, no external force will be exerted to the rotor 122. At that time, the rotor 122 can be rotated at a very stable speed. In the present embodiment, a very stable scanning operation can be carried out by utilizing the above clockwise rotation of the rotor 122 without any external force.

Figure 10:
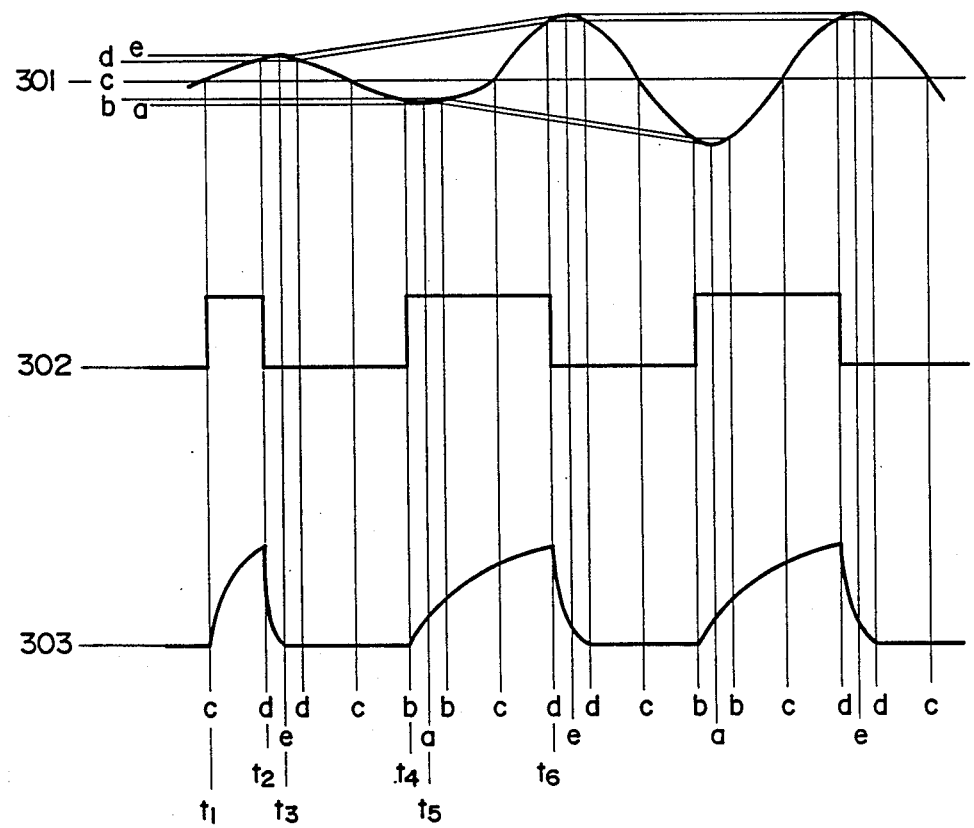
FIG. 10 is a waveform diagram illustrating the start and subsequent operations in the embodiment of FIG. 3.

FIG. 10 shows the start and subsequent operations of the rotor 122 as described hereinbefore.

At time $t_1$, the apparatus is started. In the start position, the rotor 122 is in the position c as shown by 301 in FIG. 10.

As drive pulses are applied to the input terminal 130 (FIG. 9) as shown by 302 in FIG. 10, drive waveform supplied to the exciting coils 128 rises with a predetermined time constant at time $t_1$ as shown by 303 in FIG. 10.

As the rotor 122 is being moved from the position c of FIG. 6 to the position d of FIG. 7, the supply of the exciting current is continued. When the rotor 122 reaches the position d, the drive pulses are cut off by the detector 129 (time $t_2$). As described previously, this timing of pulse cutting-off is established before the rotor 122 is positioned opposed to the yoke 126. Therefore, the rotor 122 is electromagnetically driven only on its forward rotation to assure that the rotor 122 will not be attracted to the yoke 126.

Even after the drive pulses have be cut off, the rotor 122 is further rotated slightly to the position e of FIG. 8. At time $t_3$, the rotor 122 reaches the position e wherein it is positioned opposed to the yoke 126. At that time, the rotor 122 begins to be returned back to the position a under the return action of the torsion bar 116 which has been twisted during the counter-clockwise rotation of the rotor 122.

As the rotor 122 moves past the neutral position c and then reaches the position a, the rotor 122 is forced to rotate again from the neutral position c toward the maximum rotational position e under the action of the torsional force accumulated in the torsion bar 116 as the rotor 122 is rotated in the clockwise direction.

In this manner, the rotor 122 can be repeatedly rotated between the positions a and e in the reciprocation manner.

During the period between time $t_2$ (position d) and time $t_4$ (position b), the rotor 122 can be fully freely oscillated. This free oscillation of the rotor 122 is performed at a stable velocity which is determined by the natural frequency of the entire armature, without application of any external force. Thus, a very stable scanning operation can be carried out in accordance with the present invention.

The directions of movement and printing of the armature are indicated by X and Y in FIG. 1, respectively. It is understood therefrom that the scanning beam C used to effect the printing in the laser printer is used under the stable scanning condition on the free oscillation of the torsion bar 52.

Figure 11:
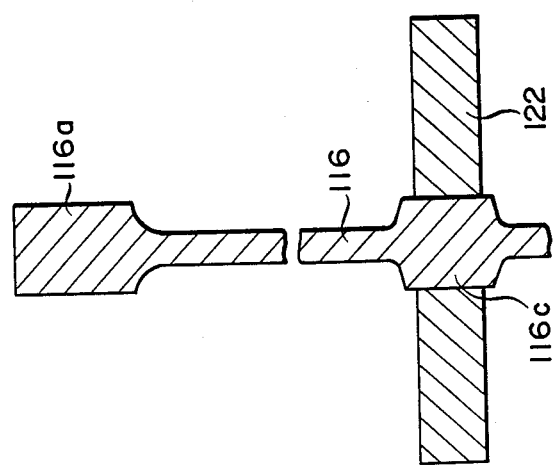

Referring now to FIG. 11, there is shown a concrete construction of the torsion bar used in the present invention, wherein the torsion bar 116 includes end enlarged-diameter portions and a central enlarged-diameter portion on which the rotor 122 is to be mounted.

In such a construction, the torsion bar 116 can more easily be clamped onto support arms at the opposite ends 116a. Similarly, the rotor 122 can more easily be fitted and mounted over the central enlarged-diameter portion 116c of the torsion bar 116. In such a case, it is preferred that the diameter of the rotor bore is equal to those of the enlarge-diameter portions 116a and 116c of the torsion bar 116.

Figure 12:
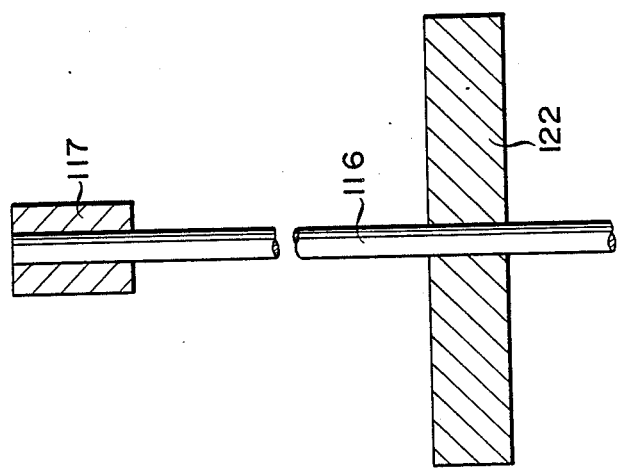
FIGS. 11 and 12 are cross-sectional views respectively showing different connections between the torsion bar and the rotor in the present invention.

FIG. 12 illustrates another modification of the torsion bar used in the present invention. The external diameter of the torsion bar 116 is unvariable throughout the length thereof. Enlarged hubs 117 are rigidly fitted over the opposite ends of the torsion bar 116 to form attachment means co-operating with the support arms. The rotor 122 is rigidly mounted on the central portion of the torsion bar 116.

In such a manner, the armature can more simply and easily be formed since the rotor 122 and the torsion bar 116 are made separately from each other.

Since in the present embodiment, the rotor has its initial bias angle and the timing used to energize the rotor is established within a predetermined range, the rotor can fully be prevented from being attracted to the yoke without any affection against the equality of drive velocity and the stable scanning operation. Thus, the optical scanner can be of a construction which is small-sized and very efficient in operation.

Figure 13:
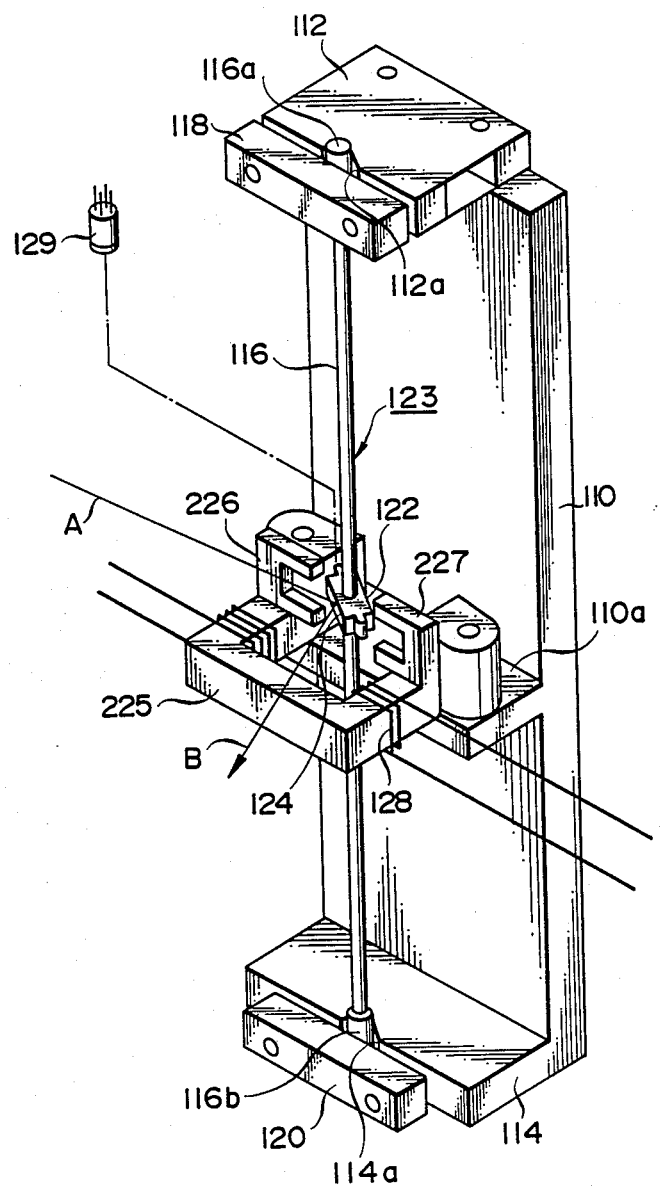
FIG. 13 is a perspective view showing the primary section of still another preferred embodiment of an optical scanner constructed according to the present invention.

Referring now to FIG. 13, there is shown another embodiment of an optical scanner relating to the present invention, in which an armature consisting of a torsion bar and rotor similar to those of FIG. 3 is rigidly supported on a base. Parts similar to those of FIG. 3 are designated by similar reference numerals and further description thereof will be omitted.

The embodiment of FIG. 13 is characterized by the construction of a yoke used therein which will be described with reference to FIGS. 13, 14 and 15.

A yoke 225 positioned opposed to the rotor 122 is of a flat and U-shaped configuration. The yoke 225 includes two pole ends 226 and 227 positioned around the region of rotation of the rotor 122 and adapted to apply an electromagnetic attraction force to the rotor 122. Each of these pole ends 226 and 227 form a pair of pole pieces located on the opposite sides of the region of rotor rotation along the vertical axis of the torsion bar.

Figure 14:
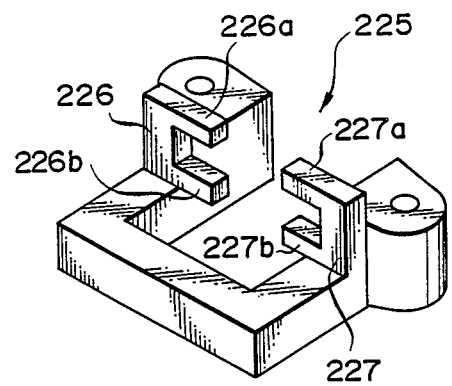
FIG. 14 is a perspective view of the yoke used in the embodiment of FIG. 13.
Figure 15:
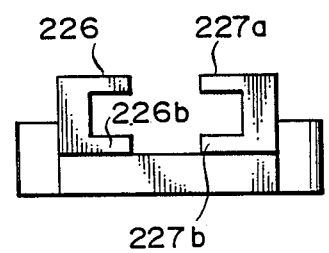
FIG. 15 is a front elevational view of the yoke shown in FIG. 14.

As can best seen from FIGS. 14 and 15, each of the pole ends 226 and 227 is of a U-shaped configuration with the legs (226a and 226b; 227a and 227b) defining a pair of pole pieces. The legs 226a and 226b of the pole ends 226 are located vertically adjacent the top and bottom of the path of the rotor 122 at one side while the legs 227a and 227b of the pole end 227 are similarly located at the other side.

The yoke 225 is bolted on the base 110 substantially at its central projection 110a. The yoke 225 has two legs around which exciting coils 128 are wound. When electric current is flowing in the exciting coils 128, a magnetic flux is created in the yoke 225 and then applied to the rotor through the pole ends 226 and 227. These exciting coils 128 may be replaced by a single exciting coil.

In order to create the magnetic flux in the exciting coils 128 at a selected timing, a phase detector is provided to monitor the rotational phase of the rotor 122 at all times.

As seen from FIG. 13, the phase detector comprises a photosensor 129 consisting of a light emitting part and a light receiving part all of which is assembled into a unit. Depending on the magnitude of an inspecting light from the photosensor 129 which is reflected by the rotor 122, the photosensor 129 generates, at its output terminal, an output substantially in the form of a sinusoidal waveform. By causing electrical waveform shaping and delaying based on such an output waveform from the phase detector, timing of drive signal supplied to the exciting coils 126 is controlled.

In the optical scanning unit shown in FIG. 13, thus, the light beam A is directed to the reflecting mirror 124 on the electromagnetically driven rotor 122 and then reflected by the mirror 124 to form a reflected beam B which in turn performs the scanning in accordance with the rotation of the rotor 122. The velocity of scanning depends on the natural torsional frequency of the torsion bar 116. There can thus be attained a scanning beam having a very stable scanning rate.

The embodiment of FIG. 13 is characterized by that the rotor 122 can have its static neutral position which is initially biased, through a predetermined angle, from the position wherein the rotor 122 is positioned opposed to the yoke 126.

Figure 16:
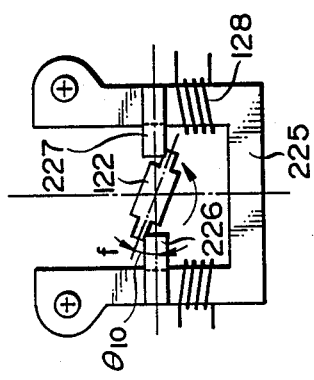

FIG. 16 shows the initial bias position of the rotor 122 which is positioned in the static neutral position f when the vibration of the torsion bar is stopped and the exciting coils 128 are de-energized.

In the static neutral position f, therefore, the rotor 122 is deviated, only by an angle $\theta_0$ which will be called "initial bias angle", from the position wherein the rotor 122 is positioned opposed to the pole ends 226 and 227 of the yoke 225. This initial bias angle $\theta_0$ can be set depending on the characteristics of the optical scanner.

Figure 18:
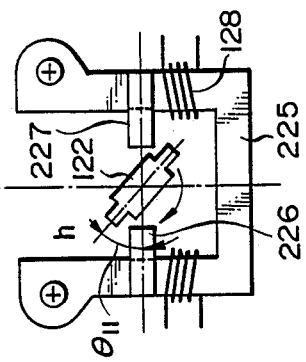
FIGS. 16, 17 and 18 illustrate various different positions of the rotor in the optical scanner shown in FIG. 13.
Figure 17:
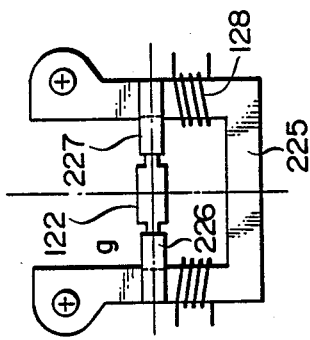

FIGS. 17 and 18 illustrate a half-cycle of the rotation in the rotor 122 shown in FIG. 16, wherein as the exciting coils 128 are energized, the rotor 122 is rotated from its initial bias position f to the maximum rotational position g shown in FIG. 17 at which the rotor 122 is positioned opposed to the pole ends 226 and 227 of the yoke 225. When the exciting current is thereafter cut off, the rotor 122 is rotated in the opposite direction under the action of the torsion bar. The rotor 122 is rotated past the initial bias position, that is, the neutral position f toward the maximum rotational position h which is shifted by $\theta_{11}$ from the position shown in FIG. 18. Thereafter, the rotor 122 is again rotated back to the maximum rotational position g. In such a manner, the rotor 122 will rotatably be oscillated between the maximum rotational positions g and h about the initial bias position f.

As in the previous embodiment, the rotor 122 is subjected to the electromagnetic attraction from the exciting coils 128 through their pole ends 226 and 227. However, the electromagnetic drive force is applied to both the top and bottom faces of the rotor 122 through the legs 226a, 226b and 227a, 227b of the pole ends 226 and 227. Therefore, the rotation of the rotor 122 is caused by the electromagnetic attraction force applied equally to its top and bottom faces from the legs 226a, 226b and 227a and 227b in addition to the horizontal electromagnetic force from the pole ends 226 and 227.

In such a manner, the amount of the electromagnetic attraction force applied horizontally to the rotor 122 can be reduced to prevent the attraction or deviation of the torsion bar 116 to the yoke 225 due to the fact that the rotor 122 and thus the torsion bar 116 is shifted toward the yoke 225 under the action of the horizontal electromagnetic force.

As in the previous embodiment, the optical scan effected through the reflecting mirror 123 on the rotor 122 is performed during the free rotation of the rotor 122 on cutting-off of the exciting current to the exciting coils 128. Accordingly, the optical scanning operation can be made at a stable speed determined by the natural frequency of the entire armature 123 without any external influence.

In the construction of the embodiment described just above, the electromagnetic attraction force is applied to both the top and bottom of the rotor from the yoke through its pole pieces to rotate the rotor. The rotor will not be attracted or deviated to the yoke. Therefore, the rotor can be rotated in a steady manner without the attraction or deviation of the rotor to the yoke. The optical scan can be made in a steady and positive manner at all times.

What is claimed is:

1. An optical scanner comprising:
a base plate disposed in the horizontal direction and having a flat reference surface;
a light source unit rigidly mounted on said base plate and adapted to emit a condensed beam of light;
an optical scanning unit for reflecting said condensed light beam in a repetitive scan cycle; and
an optical system unit for conducting the reflected scanning beam to a surface to be irradiated;
said optical scanning unit comprising a unit base rigidly mounted on said base plate, a torsion bar rigidly supported at the opposite ends of said unit base with said torsion bar being disposed transversely of said optical scanning unit and horizontally and parallel to said base plate, a rotor rigidly mounted on the twistable portion of said torsion bar and including a first mirror for reflecting said light beam, an electromagnetic drive mechanism for applying a rotational drive force to said rotor and a second mirror coupled to said unit base for reflecting the reflected light from said first mirror in a direction substantially perpendicular to the optical path of said reflected light beam from said first mirror, and the unit base of said optical scanning unit being transversely mounted on said base plate such that said torsion bar will be disposed parallel to the base plate, whereby the light beam can be scanned along a plane perpendicular to that of said base plate on the rotation of said rotor and said reflected light beam from said second mirror can be scanned along a plane substantially parallel to that of said base plate through said second mirror.

2. An optical scanner comprising:
a base plate disposed in the horizontal direction and having a flat reference surface;
a light source unit rigidly mounted on said base plate and adapted to emit a condensed beam of light;
an optical scanning unit for reflecting said condensed light beam in a repetitive scan cycle; and
an optical system unit for conducting the reflected scanning beam to a surface to be irradiated;
an optical scanning unit comprising an armature including a torsion bar fixed to said unit at the opposite ends and adapted to oscillate in a torsional manner and a rotor rigidly mounted on the twistable portion of said torsion bar and having a first mirror formed on part of said rotor; yoke means including pole ends located around and adjacent to the region of rotation of said rotation and being adapted to apply an electromagnetic drive force to said rotor; an exciting coil means for producing a magnetic flux in said yoke with a predetermined timing and wherein said rotor having its static neutral position which is initially biased by a predetermined angle from a position whereat the rotor is positioned opposed to said yoke; and a second mirror coupled to said unit for reflecting the reflected light from said first mirror in a direction substantially perpendicular to the optical path of said reflected beam from said first mirror, whereby the light beam can be scanned along a plane perpendicular to that of said base plate on the rotation of said rotor and said reflective light beam from said second mirror can be scanned along a plane substantially parallel to that of said base plate through said second mirror.

3. An optical scanner as defined in claim 2 wherein timing used to supply said exciting coil means with drive current is so selected that the drive current is cut off before said rotor is positioned opposed to said yoke.

4. An optical scanner as defined in claim 2 or 3 wherein said rotor is freely oscillated during the return stroke thereof and wherein an optical scan is made during the free oscillation of said rotor.

5. An optical scanner comprising:
a base plate disposed in the horizontal direction and having a flat reference surface;
a light source unit rigidly mounted on said base plate and adapted to emit a condensed beam of light;
an optical scanning unit for reflecting said condensed light beam in a repetitive scan cycle; and
an optical system unit for conducting the reflected scanning beam to a surface to be irradiated;
an optical scanning unit comprising an armature having a torsion bar fixed to said unit at the opposite ends and adapted to oscillate in a torsional manner and a rotor rigidly mounted on the twistable portion of said torsion bar and including a first mirror formed on part of said rotor; a yoke including pole ends located around and adjacent to the region of rotation of said rotor so as to rotate said rotor under the action of an electromagnetic attraction force; an exciting coil means for producing a magnetic flux in said yoke with a predetermined timing, the pole ends of said yoke being formed as a pair of pole pieces which are arranged adjacent to both the top and bottom of the path of rotation of said rotor along the axis of said torsion bar, whereby the electromagnetic attraction force can be applied equally to both the top and bottom sides of said rotor along the axis of said torsion bar through said pair of pole pieces; and a second mirror coupled to said unit for reflecting the reflected light from said first mirror in a direction substantially perpendicular to the optical path of said reflected beam from said first mirror, whereby the light beam can be scanned along a plane perpendicular to that of said base plate on the rotation of said rotor and said reflective light beam from said second mirror can be scanned along a plane substantially parallel to that of said base plate through said second mirror.

6. An optical scanner as defined in claim 5 wherein said pair of pole pieces are defined by two leg portions on the pole ends of a yoke which is of a U-shaped configuration.

* * * * *